United States Patent [19]

Kayanuma et al.

[11] Patent Number: 5,119,631
[45] Date of Patent: Jun. 9, 1992

[54] APPARATUS AND METHOD FOR DETECTING ABNORMALITIES IN A SECONDARY AIR SUPPLIER

[75] Inventors: Nobuaki Kayanuma, Gotenba; Yasushi Satoh, Mishima, both of Japan

[73] Assignee: Toyota Jidosha Kabushiki Kaisha, Toyota, Japan

[21] Appl. No.: 682,703

[22] Filed: Apr. 9, 1991

[30] Foreign Application Priority Data

Apr. 18, 1990 [JP] Japan ................................. 2-104144
Apr. 18, 1990 [JP] Japan ................................. 2-104145

[51] Int. Cl.$^5$ .............................................. F01N 3/22
[52] U.S. Cl. ...................................... 60/274; 60/276; 60/277; 60/289
[58] Field of Search ................ 60/274, 276, 277, 289, 60/290

[56] References Cited

FOREIGN PATENT DOCUMENTS

| 70017 | 4/1983 | Japan | .................... 60/277 |
|---|---|---|---|
| 63-111256 | 5/1988 | Japan | . |
| 63-143362 | 6/1988 | Japan | . |
| 63-212750 | 9/1988 | Japan | . |
| 248908 | 10/1988 | Japan | .................... 60/276 |

*Primary Examiner*—Douglas Hart
*Attorney, Agent, or Firm*—Kenyon & Kenyon

[57] ABSTRACT

Disclosed is an apparatus for detecting abnormality in a secondary air supplier of an engine. The operational status of the engine is monitored by various sensors. When the engine is in a warmed-up state, an electronic control unit (ECU) disables the secondary air supplier to stop secondary air from being supplied to an exhaust manifold. When the engine is in such an operational status in which the secondary air should be supplied, the secondary air supplier is activated and a fuel supplying means is controlled in such a way that a suction air-fuel ratio is forcibly adjusted to a predetermined high value so as to set an exhaust air-fuel ratio low when the secondary air supplier functions properly and set the exhaust air-fuel ratio high when the secondary air supplier is abnormal. When the exhaust air-fuel ratio is detected to be high, the ECU judges the secondary air supplier as abnormal and executes necessary processing, such as outputting an abnormality judgment signal to an external warning device.

19 Claims, 10 Drawing Sheets

APPARATUS AND METHOD FOR DETECTING ABNORMALITIES IN A SECONDARY AIR SUPPLIER

BACKGROUND OF THE INVENTION

1. Field of the Invention

The present invention relates to an apparatus and a method for detecting abnormalities in a secondary air supplier in an internal combustion engine. More particularly, the present invention pertains to detecting abnormalities in accordance with the air-fuel ratio in the exhaust system of the internal combustion engine.

2. Description of the Related Art

Generally, when an internal combustion engine is warming up and/or decelerated, secondary air is supplied to an exhaust system to improve purification of a three-way catalyst provided in the exhaust system.

During warming of the engine, more fuel is supplied to a combustion chamber so that the air-fuel ratio in an intake system is relatively high. When the engine is slowed, unburnt fuel remaining on the inner wall of an intake port is abruptly sent to the combustion chamber under a negative intake pressure. This temporarily increases the air-fuel ratio. In an internal combustion engine equipped with the secondary air supplier, however, secondary air is supplied to the exhaust system during warm-up operations and deceleration, to make the exhaust air-fuel ratio in the exhaust system low.

However, in the event that an abnormality develops such that the secondary air supplier will not work, the exhaust air-fuel ratio during the warm-up operation and deceleration becomes high like the air-fuel ratio in the intake system. Paying attention to this event, various types of apparatuses have been proposed which detect abnormalities in the secondary air supplier.

Such an abnormality detecting apparatus disclosed in, for example, Published Unexamined Japanese patent application No. 68-111256 includes an oxygen sensor in the exhaust system. The oxygen sensor serves to detect the exhaust air-fuel ratio at the time the secondary air supplier is in operation, such as during warm-up and deceleration. When the detected exhaust air-fuel ratio is high, the secondary air supplier is judged as abnormal.

According to the apparatus disclosed in Published Unexamined Japanese patent application No. 63-143362, the average of air-fuel ratio compensating coefficients is acquired based on a value detected by the oxygen sensor. The secondary air supplier is judged as abnormal if the average value is less than or equal to a predetermined value when the secondary air supplier is in operation.

Both detecting apparatuses described above are devised on the premise that the intake air-fuel ratio is slightly greater than the theoretical air-fuel ratio during warm-up and deceleration. They judge the abnormality of the secondary air supplier merely on the determination of whether the exhaust air-fuel ratio is high or low. However, at times, the air-fuel ratio in the intake system may be excessively high due to various conditions, such as a change in revolution speed of the engine. This makes the exhaust air-fuel ratio high even when the secondary air supplier works properly, which may result in an erroneous detection of abnormality. In other words, the conventional detecting apparatus is not so reliable in detecting abnormality.

SUMMARY OF THE INVENTION

It is therefore an object of the present invention to provide a reliable apparatus and a reliable method for detecting abnormalities in the secondary air supplier.

It is another object of the present invention to provide a secondary air supplying apparatus and method which can keep the exhaust air-fuel ratio steady when an abnormality is detected.

DETAILED DESCRIPTION OF THE PREFERRED EMBODIMENTS

Figure 1:
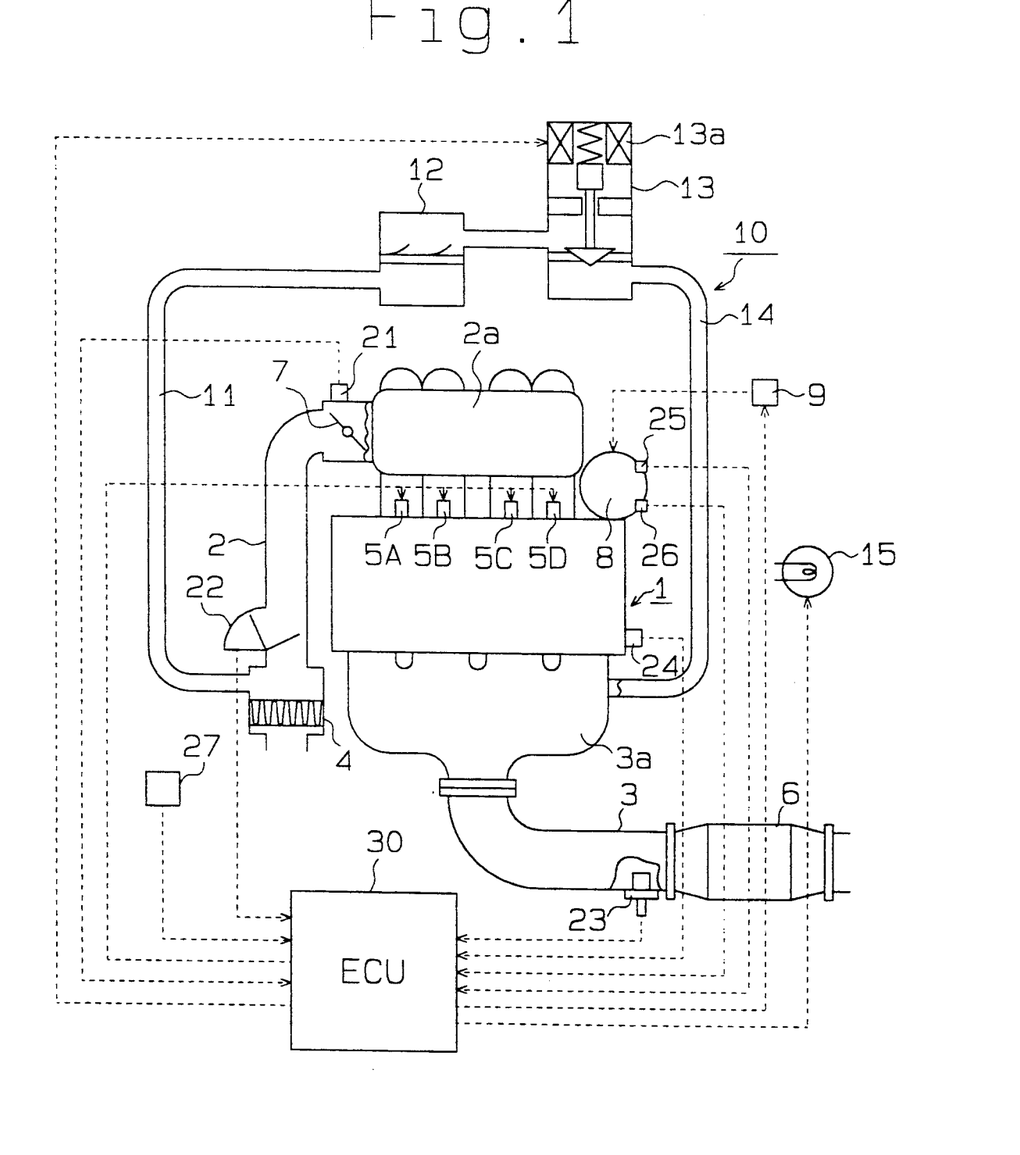
FIG. 1 is a schematic diagram illustrating a gasoline engine system using an apparatus for detecting abnormality in the secondary air supplier.

The first embodiment of the present invention will be described referring to FIGS. 1 to 6. FIG. 1 illustrates the schematic structure of a gasoline engine system using an apparatus for detecting abnormality in the secondary air supplier according to the present invention.

An engine 1 mounted on a vehicle comprises an intake pipe 2 and an exhaust pipe 3. The engine I intakes outside air from an air cleaner 4 through the intake pipe 2. While intaking the air, the engine 1 receives fuel injected from injectors 5A, 5B, 5C, and 5D provided for the respective cylinders (four cylinders in this case) in the vicinity of an intake manifold 2a. The engine 1 burns a mixture of the fuel and outside air in the individual combustion chambers to acquire driving force. Then, the engine 1 discharges the exhaust gas along the exhaust pipe 8 through a catalytic converter 6 containing a three-way catalyst therein.

Located along the intake pipe 2 is a throttle valve 7 interlocked with the operation of an accelerator pedal (not shown) to be opened or closed. The intake air flow to the intake manifold 2a is adjusted by the opening/closing action of the throttle valve 7.

A throttle position sensor 21 in the vicinity of the throttle valve 7 is disposed for detecting opening of the valve. A well-known air flow meter 22 is placed upstream of the throttle valve 7 to detect the intake air flow. Also provided along the exhaust pipe 3 is an oxygen sensor 23 as an exhaust air-fuel ratio detecting means for detecting the oxygen concentration in the exhaust gas, i.e., the exhaust air-fuel ratio in the exhaust pipe 3. A water temperature sensor 24 for detecting the cooling water temperature, THW, is also provided in the engine 1.

A voltage signal instructing ignition, distributed by a distributor 8, is applied to a spark plug (not shown) in every cylinder of the engine 1. The distributor 8 distributes a high voltage output from the igniter 9 in accordance with a crank angle of the engine 1. Therefore, an ignition timing for each spark plug is determined according to the timing of outputting the high voltage from the igniter 9.

Attached to the distributor 8 are an engine speed sensor 25 and a crank angle sensor 26. The sensor 25 detects the speed of the engine (engine speed) N by the rotor revolution. The crank angle sensor 26 detects a change in crank angle of the engine 1 in a predetermined rate in accordance with the rotor revolution. In this embodiment, provided that the engine makes two revolutions in one cycle, the crank angle sensor 26 detects a crank angle at a rate of 360° CA.

A vehicle velocity sensor 27 for detecting a vehicle speed SPD is provided in a transmission (not shown) which is coupled to the engine 1 in an interlocking manner.

The secondary air is supplied from the secondary air supplier 10 to the exhaust manifold 3a of the exhaust pipe 3. The secondary air supplier 10 is of an air suction type which directly sucks the air from the intake pipe 2 using the pulsation of the exhaust pipe 3. The secondary air supplier 10 includes an outlet pipe 11 which brings out the air from between the air cleaner 4 and the air flow meter 22 of the intake pipe 2. It also includes a check valve 12 communicating with the outlet pipe 11, a solenoid valve 18 communicating with the check valve 12, and a supply pipe 14 for supplying the outlet air from the solenoid valve 13 as the secondary air to the exhaust manifold 3a.

As the check valve 12, a lead valve is used which prevents the flow of the secondary air from the intake pipe 2 to the exhaust manifold 3a from being reversed. The solenoid valve 13 is closed with its coil 13a deenergized. When the coil 13a is energized, the solenoid valve 18 opens to send air to the supply pipe 14. The oxygen sensor 23 is located in the exhaust pipe 3 downstream of where the secondary air is supplied from the supply pipe 14.

The driving timings of the injectors 5A to 5D, the igniter 9 and the solenoid valve 13 are controlled by an electronic control unit (hereafter referred to simply as "ECU") 30. More specifically, the ECU 30 properly controls the injectors 5A to 5D, the igniter 9 and the solenoid valve 13, based on the output signals from the air flow meter 22 and the sensors 21 and 23 to 27. Upon judging that there is an abnormality in the secondary air supplier 10, the ECU 30 turns on a warning lamp 15 to inform a driver of the abnormality.

Based on detection signals from the sensors 21, 24, 25 and 27 and the air flow meter 22, the ECU 30 judges if the engine 1 is undergoing or has completed a warm-up operation. In accordance with the judgment, the ECU 30 determines whether the engine 1 is in a particular operation, such as deceleration, where the secondary air supplier 10 should be activated.

Figure 2:
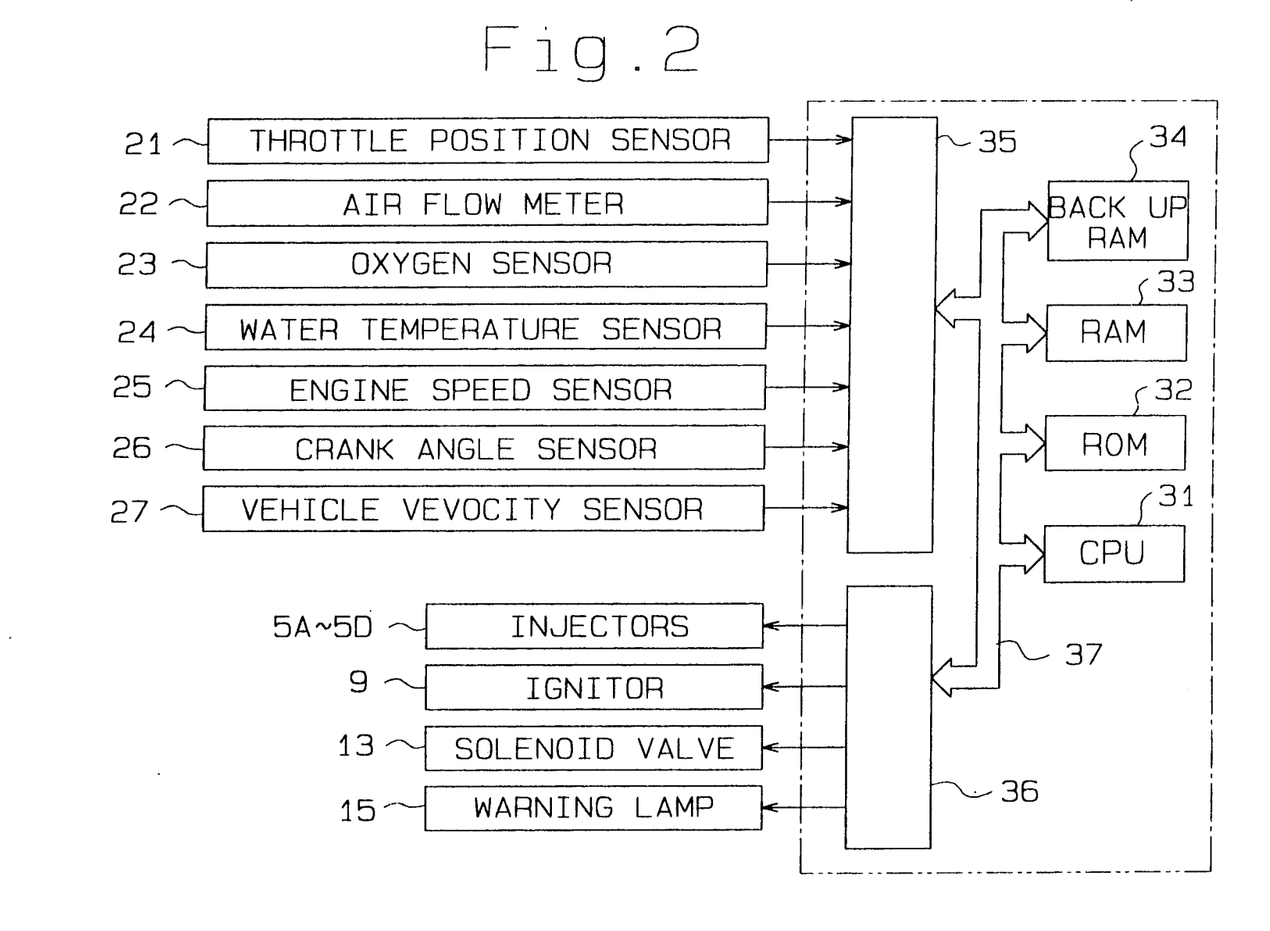
FIG. 2 is a block diagram illustrating the electric structure of the abnormality detecting apparatus for the secondary air supplier.

The structure of the ECU 30 will now be described referring to FIG. 2. The ECU 30 is constituted as a logical operation circuit which comprises a central processing unit (hereafter referred to as "CPU") 31, a read only memory (ROM) 32, a random access memory (RAM) 33, a backup RAM 34, an input device 35 and an output device 36. The former four components are connected to the last two through a bus 37. The ROM 32 has a predetermined control program, etc., stored therein in advance. The RAM 33 temporarily stores the result of computation done by the CPU 31. The backup RAM 34 holds data stored in advance.

Connected to the input device 35 are the throttle position sensor 21, the air flow meter 22, the oxygen sensor 23, the water temperature sensor 24, the engine speed sensor 25, the crank angle sensor 26 and the vehicle velocity sensor 27, all described above. The CPU 31 reads output signals from the air flow meter 22 and the sensors 21 and 28 to 27 as input values through the input device 35. Based on these input values, the CPU 31 properly controls the injectors 5A to 5D, the igniter 9, the solenoid valve 13 and the warning lamp 15, all of which are connected to the output device 36.

Figure 3:
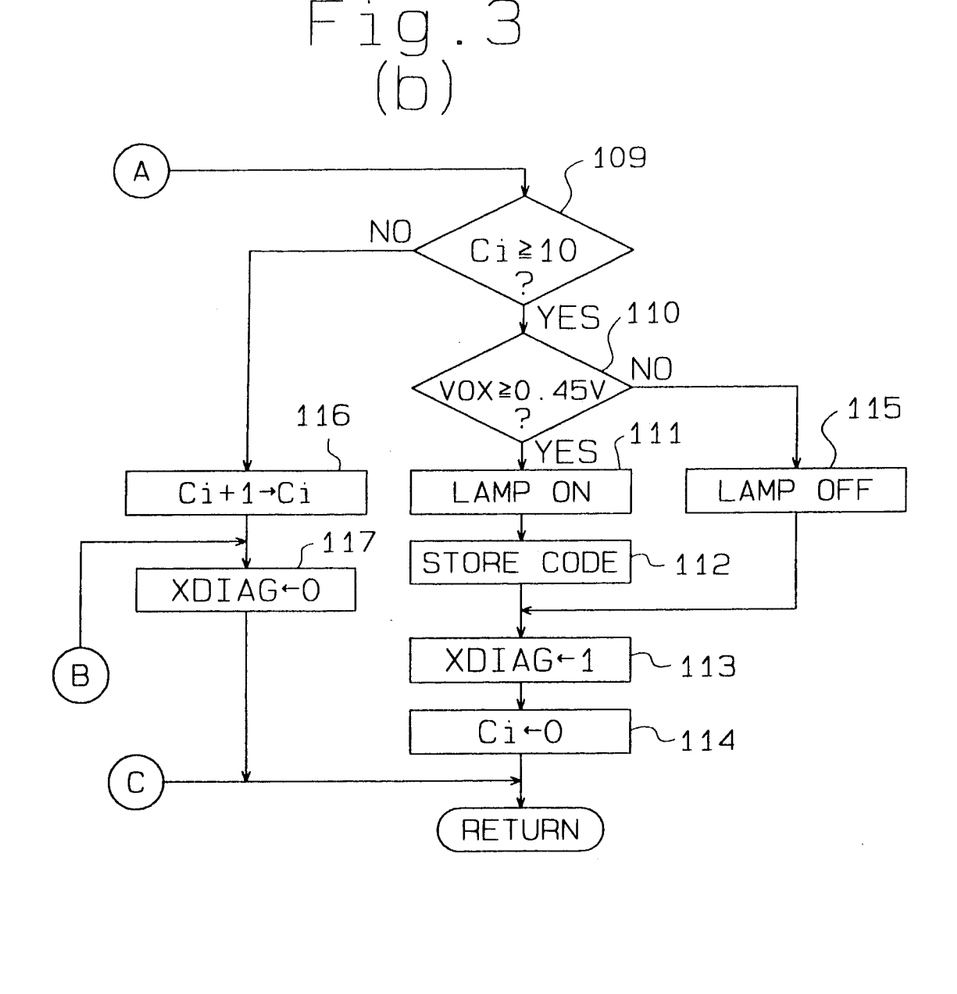
FIGS. 3A and 3B are flow charts showing the main control which is executed when an abnormality is detected in the secondary air supplier.
Figure 3A:
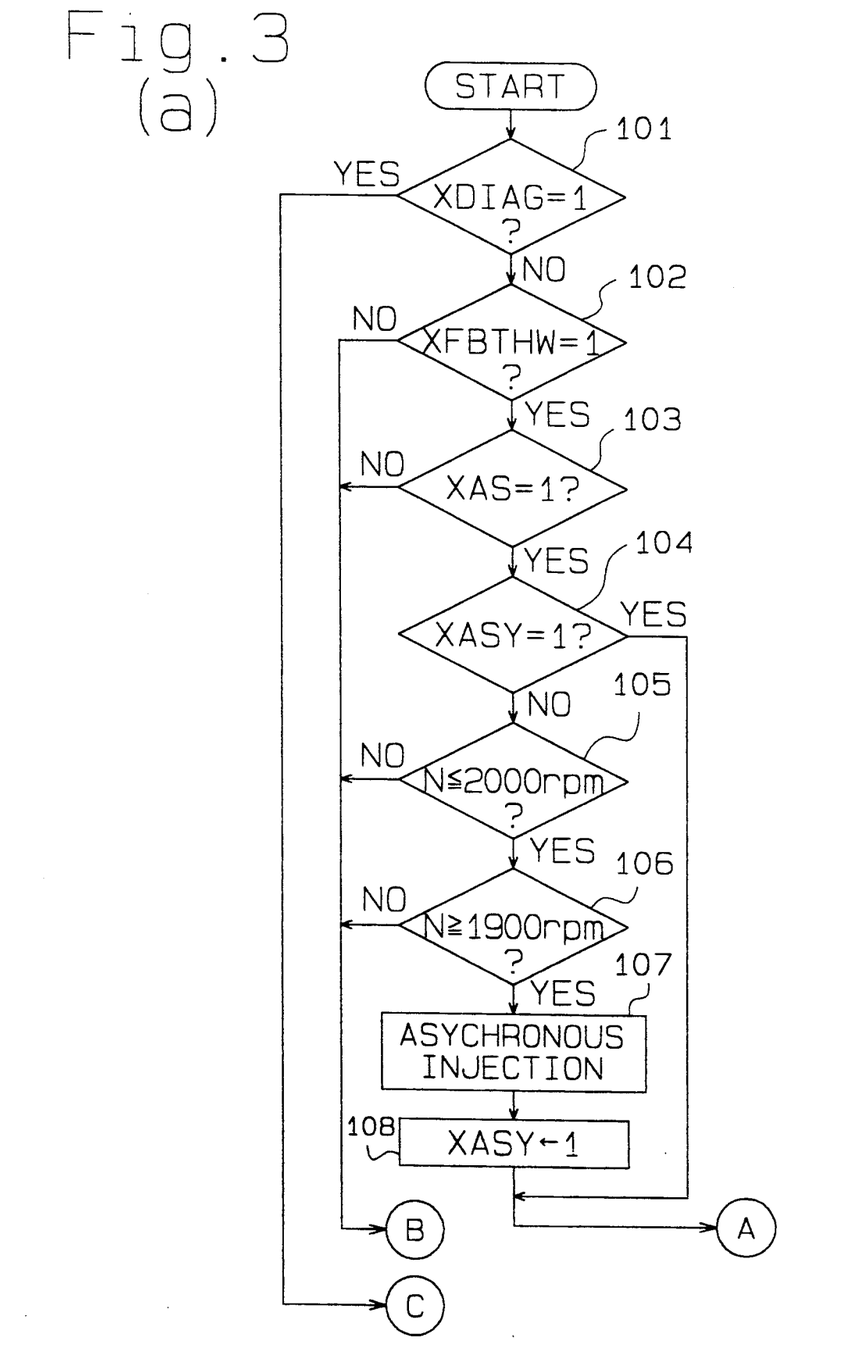

Regarding the detection of abnormality in the secondary air supplier 10 executed by the ECU 30, the main control will now be explained referring to FIGS. 3A and 3B. This routine will be executed when an interrupt is generated every predetermined period of time.

When the process enters this routine, the CPU 31 determines in Step 101 if a Diagnosis Completion flag XDIAG is set to "1." That is, the CPU 31 judges if abnormality in the secondary air supplier 10 has already been detected. When the abnormality has been detected and the flag XDIAG has been set to "1," the CPU 31 terminates the process. When there is no abnormality detected and the flag XDIAG has been set to "0," the CPU 31 advances to Step 102.

The CPU 31 determines in Step 102 whether a Feedback Water Temperature flag XFBTHW is set to "1." The CPU 31 judges if the water temperature THW is sufficiently high after the warm-up operation of the engine 1 has been completed, to permit feedback control of the air-fuel ratio. This flag XFBTHW is to be set in another routine (not shown) based on the output signal from the water temperature sensor 24. For example, when the cooling water temperature THW is equal to or higher than 40° C., the flag XFBTHW is set to "1," while the water temperature is lower than 40° C., the flag is reset to "0." When the temperature THW is low and the flag XFBTHW is "0" in Step 102, the CPU 31 advances to Step 117 to reset the flag XDIAG to "0," discontinuing the process. When the water temperature THW is high enough and the flag XFBTHW is "1," the CPU 31 judges that the engine 1 has been warmed up, and moves to Step 103.

The CPU 31 determines in Step 103 if a Secondary Air Supply flag XAS is set to "1." This step is executed to judge whether the secondary air supplier 10 has been activated and is supplying the secondary air. This Secondary Air Supply flag XAS is to be set or reset in a routine shown in FIG. 4 as will be described later. When the secondary air is not being supplied and the Supply flag XAS is "0," the CPU 31 moves to Step 117 to reset the Completion flag XDIAG to "0," temporarily terminating the process. When the secondary air is being supplied and the Supply flag XAS is set to "1," the CPU 31 advances to Step 104.

In Step 104, the CPU 31 determines if a Fuel Injection flag XASY is set to "1." This step is executed to judge whether or not asynchronizing injection has been already performed to detect the abnormality in the secondary air supplier 10. If the asynchronizing injection has already been carried out and the Injection flag XASY is "1," the flow moves to Step 117.

When the asynchronizing injection has not yet been performed and the Injection flag XASY is "0," the CPU 31 executes the subsequent Steps 105 and 106 to determine if the asynchronizing injection should be performed.

Based on the output signal from the engine speed sensor 25, the CPU 31 determines in Step 106 whether the engine speed N is equal to or below 2000 rpm. When the engine speed N is over 2000 rpm, the CPU 31 moves to Step 117 to reset the Completion flag XDIAG to "0," terminating this routine.

When the engine speed N is equal to or lower than 2000 rpm, the CPU 31 determines in Step 106 if the engine speed N is equal to or above 1900 rpm. When the engine speed N is under 1900 rpm, the CPU 31 advances to Step 117 to reset the Completion flag XDIAG to "0," terminating the routine. When the engine speed N is equal to or greater than 1900 rpm in Step 106, the CPU 31 judges that the engine speed N is within the range between 1900 rpm and 2000 rpm, moving on to Step 107.

Figure 6:
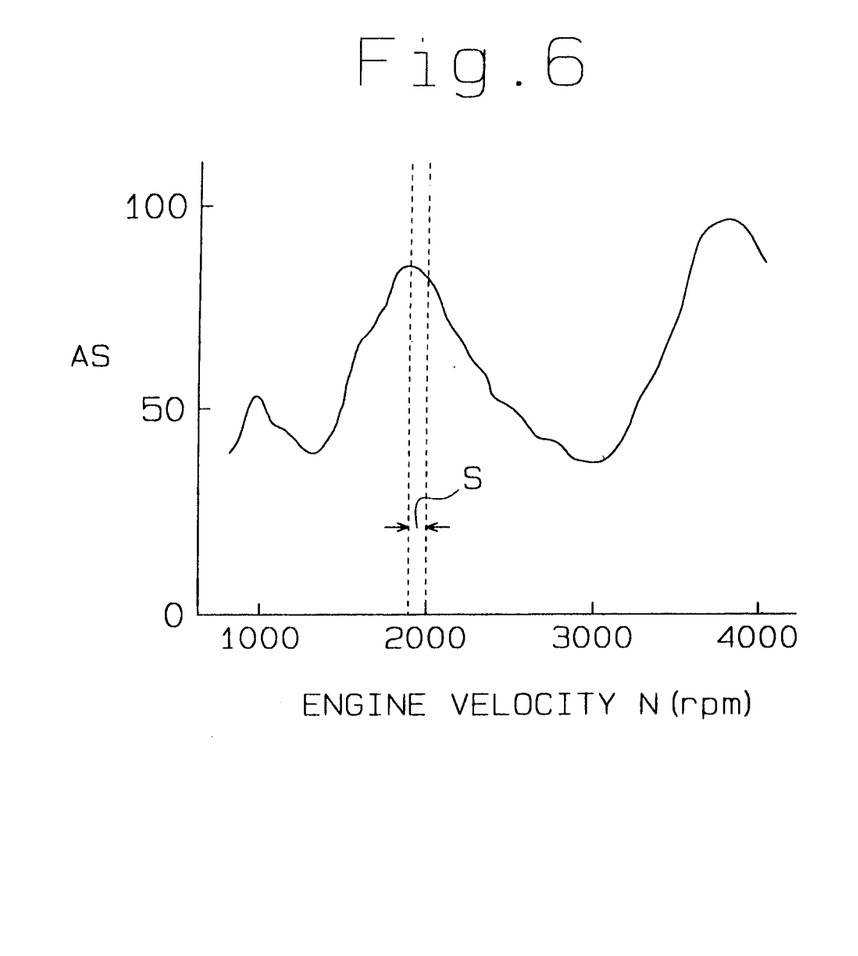
FIG. 6 is a diagram illustrating the characteristics of the flow of the secondary air with respect to engine revolutions.

The characteristic of the secondary air flow with respect to the engine speed N will now be represented in FIG. 6. As is apparent from this graph, there are peaks and valleys in the secondary air flow characteristic in accordance with the engine speed N. According to this embodiment, the abnormality detection in the secondary air supplier 10 was performed with the engine speed N in an area S between 1900 rpm and 2000 rpm. This is because the engine speed N in this area S is actually useful, and the amount of the secondary air flow increases in this area. Another reason is that the engine speed N in the area S is not likely to result in erroneous judgment that the secondary air supplier 10 is abnormal although it is properly functioning when detection of abnormality in the secondary air supplier 10 is executed. The characteristic of the secondary air flow differs very much according to the displacement of the engine 1. Therefore, the area of the engine speed N for detecting abnormality in the secondary air supplier 10 differs depending on the particular engine in use.

Referring again to FIGS. 3A and 3B, the CPU 31 executes the asynchronizing injection during a predetermined period of time in Step 107 to detect abnormality in the secondary air supplier 10. In other words, the CPU 31 simultaneously activates all the injectors 5A to 5D at a predetermined crank angle once in one revolution of the engine 1 to inject fuel. Then, the CPU 31 sets the Injection flag XASY to "1" in Step 108.

The CPU 31 determines in Step 109 if a counter Ci has counted a predetermined period of time ("10" in this embodiment) after the asynchronizing injection has been executed. In other words, the CPU 31 judges whether a sufficient period of time to judge the exhaust air-fuel ratio has passed since the asynchronizing injection.

When the counter Ci is below "10," the CPU 31 advances to Step 116 to increment the value of the counter Ci by "1." Then the CPU 31 resets the Completion flag XDIAG to "0" in Step 117, discontinuing the routine. When the counter Ci reaches "10," the CPU 31 moves to Step 110.

The asynchronizing injection and the passage of the predetermined period of time "10" will now be described. When the asynchronizing injection is performed and the predetermined time "10" has passed, the exhaust air-fuel ratio in the intake manifold 2a is forcibly adjusted to a predetermined high value. This value is set so that the exhaust air-fuel ratio may become low when the secondary air supplier 10 functions normally to supply a given amount of the secondary air to the intake manifold 2a, and the exhaust air-fuel ratio may become high when abnormality occurs in the secondary air supplier 10, inhibiting the supply of the constant secondary air flow to the intake manifold 2a.

The CPU 31 determines in Step 110 if the output voltage VOX (oxygen sensor output) of the oxygen sensor 23 has reached a predetermined value ("0.45 V" in this embodiment) to thereby determine the exhaust air-fuel ratio. When the output voltage VOX has not reached 0.45 V, the CPU 31 judges that the exhaust air-fuel ratio is low again and that the secondary air supply is properly operating. It thus keeps the warning lamp 15 off in Step 115. The CPU 31 sets the Completion flag XDIAG to "1" in Step 113, and resets the counter Ci to "0" in Step 114, subsequently discontinuing the process.

When the output voltage VOX is above 0.45 V in Step 110, which means that the exhaust air-fuel ratio is high, the CPU 31 judges that the secondary air is not properly supplied. Judging that abnormality has occurred in the secondary air supplier 10, the CPU 31 turns on the lamp 18 in Step 111. Then in Step 112 the CPU 31 stores diagnostic codes indicative of the abnormality in the secondary air supplier 10 in the backup RAM 34. The CPU 31 sets the Completion flag XDIAG to "1" in Step 113, and resets the counter Ci to "0" in Step 114, terminating the processing.

In the above-described routine, since the lamp 15 is turned on when the secondary air supplier 10 is abnormal, the driver can notice the occurrence of the abnormality instantaneously, and can cope with it promptly. Since the information of the abnormality in the secondary air supplier 10 is stored in the diagnosis codes, the secondary air supplier 10 can be completely checked in a periodical inspection of the vehicle.

The flags XDIAG and XASY and the counter Ci are to be reset to "0" when the engine 1 is temporarily stopped, though such description is omitted in this routine.

Figure 4:
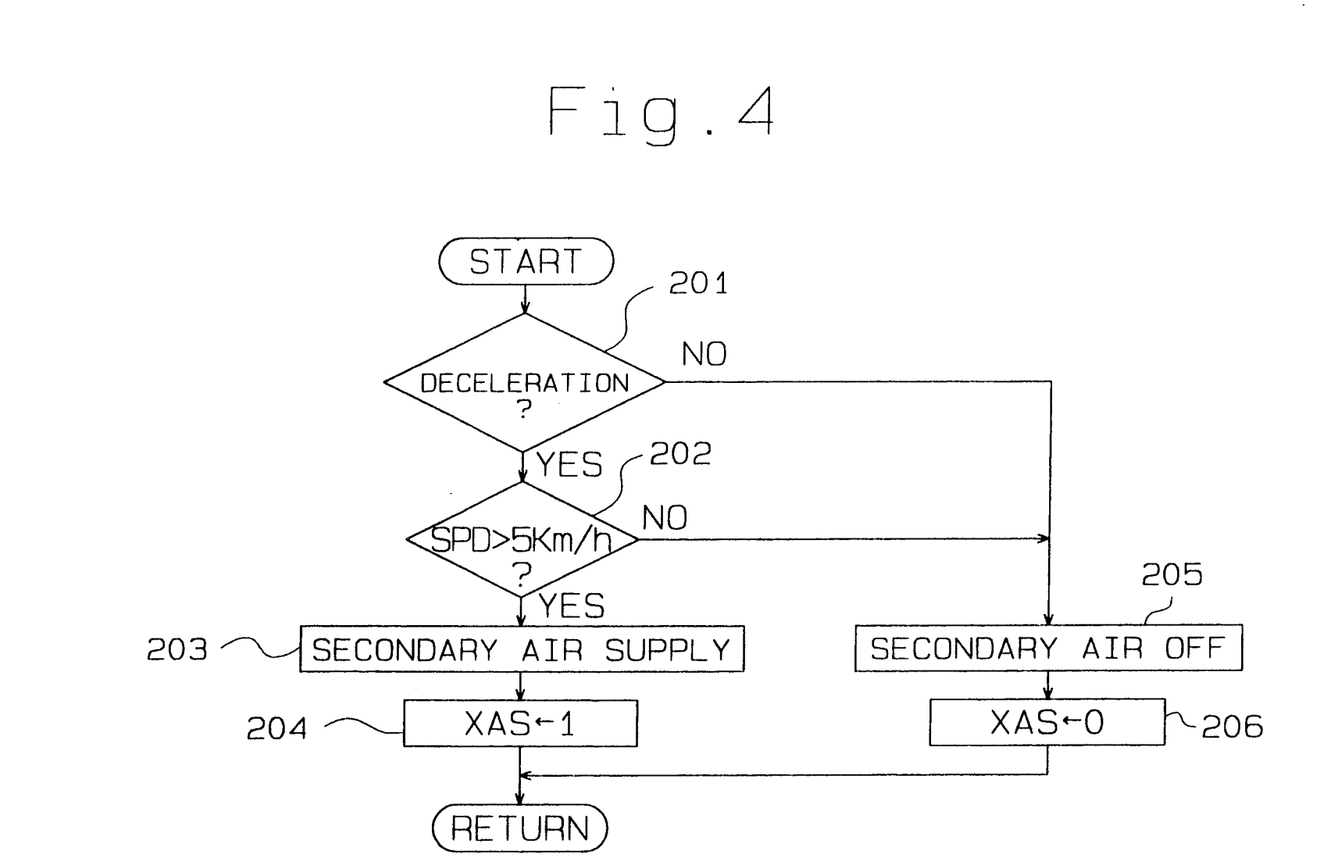
FIG. 4 is a flow chart showing the control of the secondary air supply.

The control of the secondary air supply executed by the ECU 30 will now be described referring to the flow chart shown in FIG. 4. This routine will also be performed upon generation of an interrupt every predetermined period of time.

When the processing moves to this routine, the CPU determines in Step 201 if the vehicle is decelerating based on the input signal from the throttle position sensor 21. In other words, when the accelerator pedal is released to abruptly close the throttle valve 7, the throttle position sensor 21 detects deceleration.

When the vehicle is detected as decelerating in Step 201, the CPU 31, based on the input signal from the vehicle velocity sensor 27, determines in Step 202 if the vehicle speed SPD has reached a predetermined limit ("5 km/h" in this embodiment) at which the secondary air can be supplied. When the vehicle speed is greater than 5 km/h, the CPU 31 judges that the secondary air supply is possible, and opens the solenoid valve 13 of the secondary air supplier 10 in Step 203 to supply the secondary air to the exhaust pipe 3. The CPU 31 then sets the Secondary Air Supply flag XAS to "1" in Step 204, terminating the routine. When the Supply flag XAS is set to "1" in this time, this also means that the fuel injection control is of an open loop type which does not perform feedback-control of the air-fuel ratio.

When the vehicle speed SPD is under 5 km/h in Step 201, the CPU 31 judges that the secondary air supply is impossible, and closes the solenoid valve 13 in Step 205 to shut the stream of the secondary air to the exhaust pipe 3. Then the CPU 31 resets the Supply flag XAS to "0" in Step 206, discontinuing the routine.

An example of the control on detection of abnormality in the secondary air supplier 10 will now be explained referring to FIG. 5. Until time t1 in FIG. 5, the air-fuel feedback is controlled based on the output voltage of the oxygen sensor, VOX, and neither the secondary air supply nor the asynchronizing injection is conducted. When the vehicle starts decelerating at time t1, the supply of the secondary air begins. As a result, the output voltage VOX remains low.

Later, when the engine speed N gradually decreases to below 2000 rpm at time t2, the asynchronizing injection is executed for a predetermined period, and the counter Ci starts counting up at the same time. When the count of the counter Ci is "10" at time t3, it is determined if the output voltage VOX is high or low.

Figure 5:
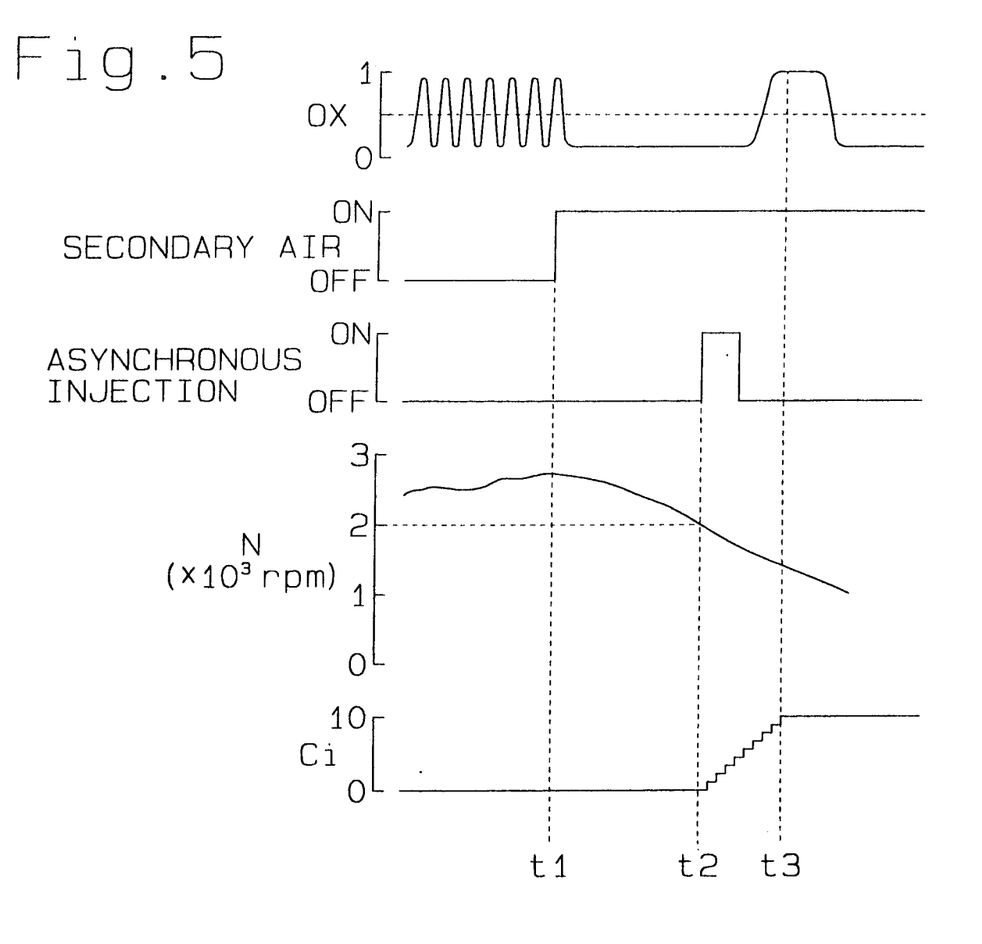
FIG. 5 is a time chart exemplifying the control of the detection of abnormality in the secondary air supplier.

Referring to FIG. 5, the output voltage VOX is high, indicating that the secondary air supplier 10 is abnormal and the sufficient amount of the secondary air is not supplied. When the secondary air supplier 10 functions normally, the output voltage VOX remains low, unlike the one shown in FIG. 5.

The length of time from the execution of the asynchronizing injection in the intake pipe 2 to the response by the oxygen sensor 23 slightly differs depending on the intake volume and exhaust volume of the engine, the oxygen sensor 23 or the amount of secondary air to be supplied. Therefore, it is important that the value counted by the counter Ci should be set to match an individual engine in use.

In this embodiment as described above, with the engine 1 warmed up, the air-fuel ratio in the intake manifold 2a is forcibly adjusted to a predetermined high ratio so as to set the proper exhaust air-fuel ratio for judgment of the normal/abnormal status of the engine. Then, the detection of abnormality in the secondary air supplier 10 is executed. Conventionally, the abnormality detection has been performed under an uncertain condition in which the intake air-fuel ratio during warm-up or deceleration is simply estimated larger to a degree than a theoretical air-fuel ratio. In this embodiment, however, the air-fuel ratio after a warm-up of the vehicle is controlled to become a predetermined high air-fuel ratio.

Therefore, reliability of the exhaust air-fuel ratio at the time of the abnormality detection increases. Detection errors can be prevented, such as judging the secondary air supplier 10 as abnormal though it is working normally, ensuring the abnormality detection with high reliability.

The aforementioned embodiment may be modified in the following manners.

(a) In detecting abnormality in the secondary air supplier 10, the air-fuel ratio is adjusted to a predetermined high air-fuel ratio by injection other than asynchronizing injection.

(b) In place of the secondary air supplier 10 of an air suction type, the secondary air supplier of an air injection type is used to supply the air by means of a pump.

The second embodiment according to the present invention will now be described referring to FIGS. 7 and 8. The engine 1 and all the sensors in this embodiment have the same structures as those in the first embodiment. The difference lies only in the operation program of the ECU 30 to detect abnormality in the secondary air supplier 10. This program runs to forcibly activate the secondary air supplier 10 to measure the air-fuel ratio while the engine 1 is idling, and determine if a failure exists in the secondary air supplier 10 based on the result of the measurement.

Figure 7A:
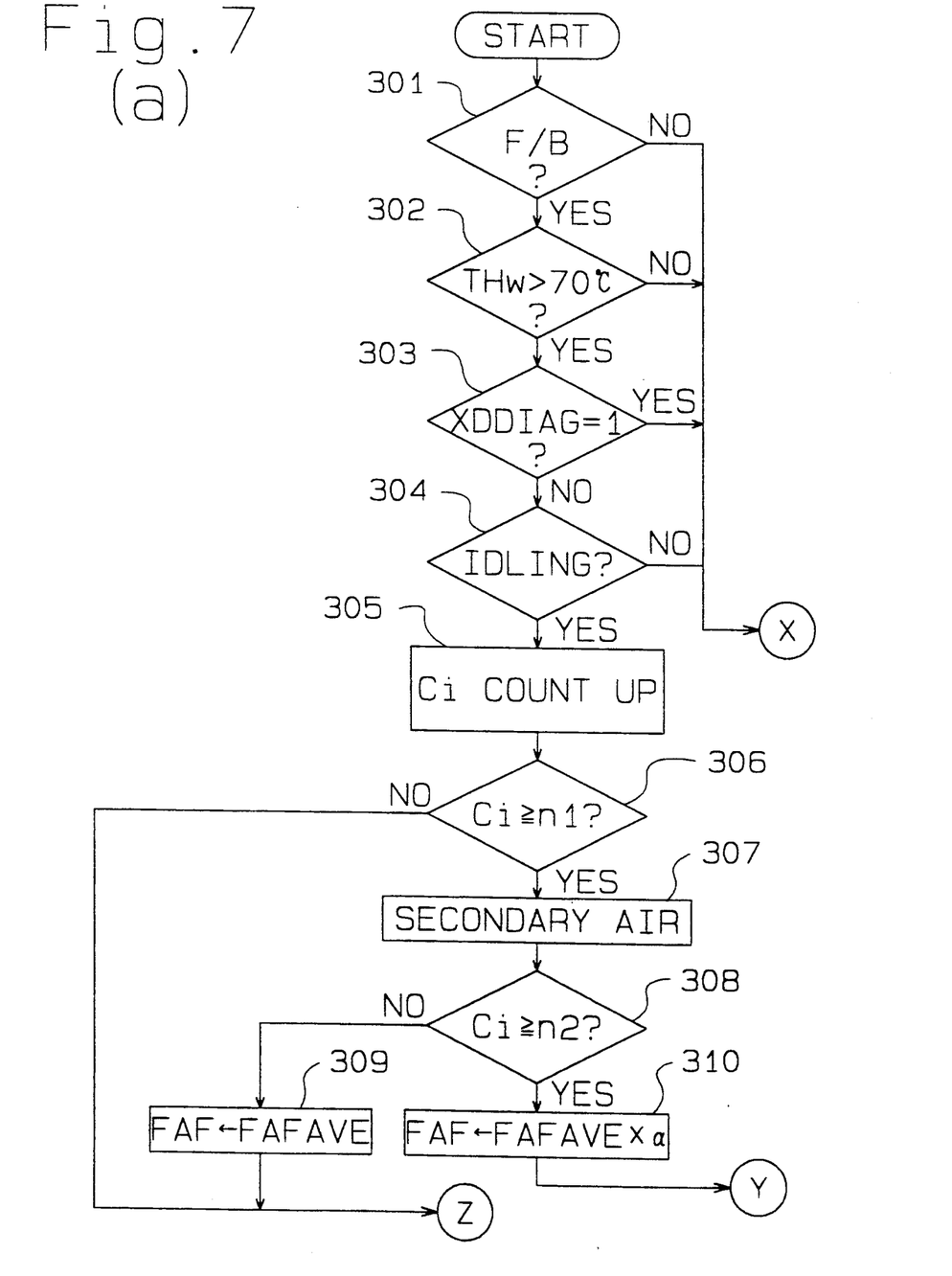
FIGS. 7A and 7B are flow charts showing the main control to detect an abnormality according to the second embodiment of the present invention.
Figure 7B:
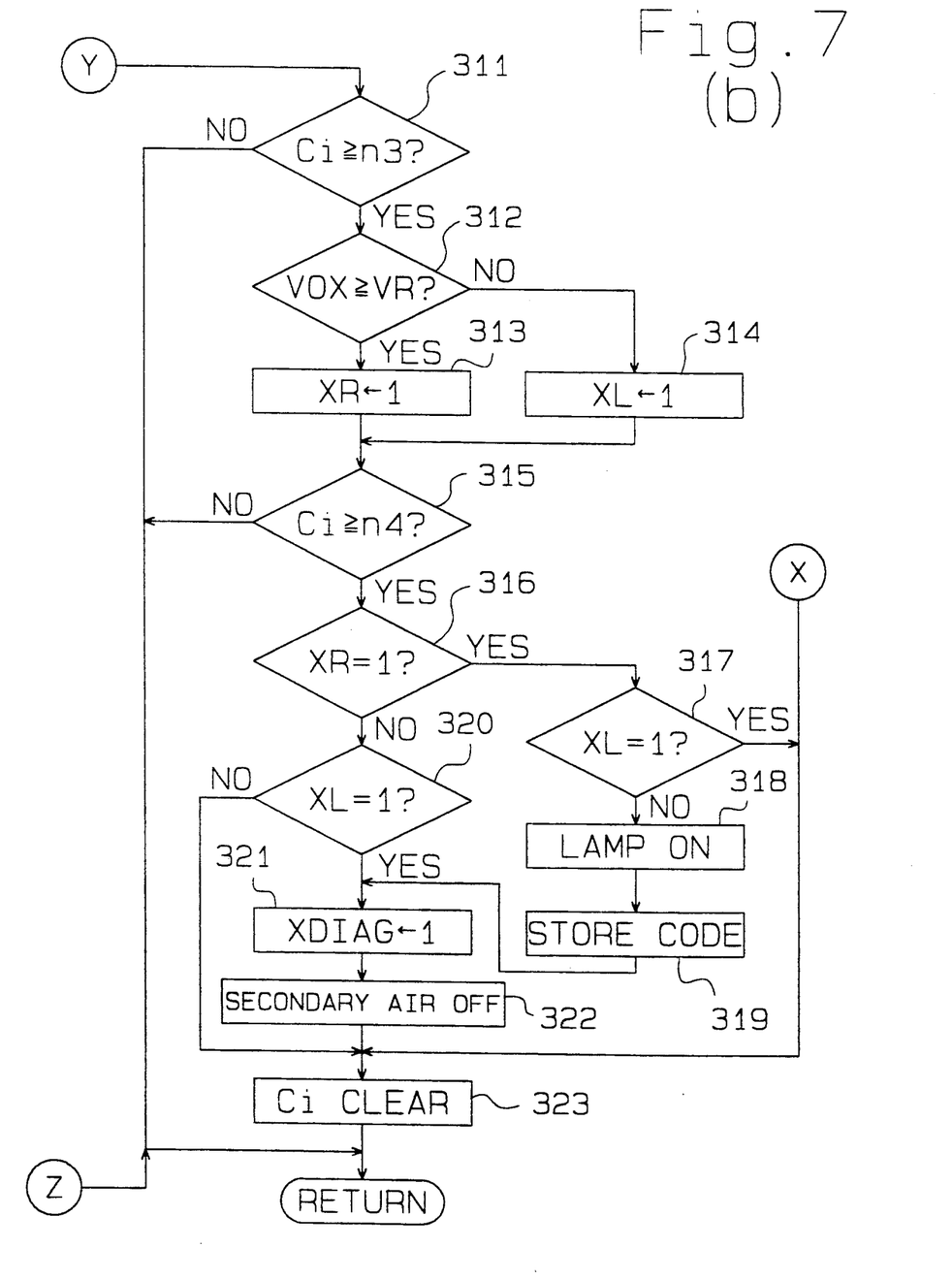

As shown in FIGS. 7A and 7B, the CPU 31 determines in Step 301 if the conditions have been met to execute the feedback control (F/B) of the air-fuel ratio. Specifically, based on detection signals from the water temperature sensor 24, the air flow meter 22 and engine speed sensor 25, the CPU 31 determines if a sufficient time has passed since the activation of the engine 1 and the cooling water temperature THW is sufficiently high, or if the engine 1 is running under a high load and at a high speed. When it is judged that the conditions to execute the feedback control of the air-fuel ratio have not been satisfied, the CPU 31 moves to Step 323. When the conditions are met the CPU 31 moves to Step 302.

The CPU 31 determines in Step 302 whether or not the cooling water temperature THW is above 70° C., i.e., whether or not the engine 1 has been warmed up. When the warm-up of the engine 1 has not been completed yet and the cooling water temperature THW is equal to or below 70° C., the CPU 31 advances to Step 323. When the engine 1 is warmed up and the cooling water temperature is higher than 70° C., the CPU 31 determines in Step 303 whether or not the Diagnosis Completion flag XDIAG is set to "0." Accordingly, the CPU judges if abnormality detection in the secondary air supplier 10 has been already executed. When the abnormality detection has been executed and the Completion flag XDIAG is set to "0," the CPU 31 advances to Step 323. When abnormality detection has not yet been executed and the Completion flag XDIAG is "0," the CPU 31 moves to Step 304.

The CPU 31 determines in Step 304 whether idle conditions to execute idling as the normal operation have been met. Based on the detection signals from the engine speed sensor 25, the throttle position sensor 21 and the vehicle velocity sensor 27, the CPU 31 determines, for example, if the engine speed N is below 900 rpm, if the throttle valve 7 is closed, or if the vehicle velocity is below 5 km/h. When the above idle conditions have not been satisfied, the CPU 31 moves to Step 323. When the idle conditions have been met, the CPU 31 advances to Step 305.

The CPU 31 counts up the counter Ci in Step 305, and then determines in Step 306 if the count value of the counter Ci has reached a given time n1 (five seconds, for example), i.e., whether or not the given time n1 has passed since the abnormality detecting conditions were met. This step is executed to judge whether the operational status in the abnormality detecting conditions has become steady. If the given time n1 has not passed, the CPU discontinues the routine and will count up the counter Ci in the next control period. When the time n1 has passed, the CPU 31 in Step 307 opens the solenoid valve 13 in the secondary air supplier 10 to forcibly supply the secondary air to the exhaust pipe 3.

After the secondary air supply has started, if the CPU 31 judges in Step 308 that the count value of the counter Ci has not reached a given time n2 (six seconds, for example), the CPU 31 stops the feedback control of the air-fuel ratio, switches the control to the open loop control of the air-fuel ratio, and controls the injectors 5A to 5D to set the amount of compensation for fuel injection, FAF, to the approximate value of the theoretical air-fuel ratio, FAFAVE, in Step 309 and then leaves the routine.

During a period of time in which the secondary air is surely supplied to the exhaust pipe 3, including the response delay of the solenoid valve 13, the CPU 31 controls the air-fuel ratio to the approximate value of the theoretical air-fuel ratio to suppress discharging of harmful components. When the time n2 has passed, the CPU 31 stops the feedback control of the air-fuel ratio, switches the control to the open loop control of the air-fuel ratio, and controls the injectors 5A to 5D to set the amount of compensation for fuel injection, FAF, $\alpha$ times ($\alpha = 1.05$) as great as the approximate value of the theoretical air-fuel ratio FAFAVE in Step 310.

The value which is $\alpha$ times as many as the FAFAVE in Step 310 is an experimental value which sets the exhaust air-fuel ratio low when the secondary air supplier 10 normally functions to supply a given amount of the secondary air to the intake manifold 2a, and sets the exhaust air-fuel ratio become high when abnormality in the secondary air supplier 10 is detected, resulting in a shortage of the secondary air to be supplied to the intake manifold 2a.

The CPU 31 determines in Step 311 if the count value of the counter Ci has reached a given time n3 (e.g., seven seconds), or if the given time n3 has passed since the abnormality detecting conditions were met. If the given time n3 has not passed yet, the CPU 31 terminates the routine. When the time n3 has passed, the CPU 31 moves to Step 312.

The CPU 31 determines in Step 312 that the output voltage of the oxygen sensor, VOX, at the time is equal to or above a reference value VR. Accordingly, the CPU 31 determines whether the exhaust air-fuel ratio is high or low at the time the given time n3 has passed. When the exhaust air-fuel ratio is high, the CPU 31 sets a Rich flag XR to "1" in Step 313, thereafter moving to Step 315. When the exhaust air-fuel ratio low, the CPU 31 sets a Lean flag XL to "1" in Step 314, thereafter advancing to Step 315.

In Step 315, the CPU 31 reads the count value of the counter Ci to determine whether or not a given time n4 (e.g., ten seconds) has passed since the abnormality detecting conditions were met. If the given time n4 has not passed, the CPU 31 terminates the routine. When the time n4 has passed, the CPU 31 advances to Step 316.

The CPU 31 determines in Step 316 whether or not the Rich flag XR is set to "1." When the Rich flag XR is set to "1," the CPU 31 determines in Step 317 whether or not the Lean flag XL is set to "1." When the Rich flag is "1" and the Lean flag is "0," the CPU 31 then judges that the secondary air supplier 10 is functioning abnormally, and turns on the warning lamp 15 in Step 318. In the next Step 319, the CPU 31 stores information of abnormality in the secondary air supplier 10 in the diagnosis codes in the backup RAM 34.

The CPU 31 sets the Diagnosis Completion flag XDIAG to "1" in Step 321, and closes the solenoid valve 13 in the secondary air supplier 10 to stop the secondary air supplied to the exhaust pipe 3 in Step 322. Then the CPU 31 clears the value of the counter Ci in Step 323, and terminates the routine.

When the Rich flag XR and Lean flag XL are both "1," this may cause erroneous detection of abnormality due to noise, thus requiring the abnormality detection again. Consequently, the CPU 31 clears the value of the counter Ci in Step 323, and leaves the routine.

When the Rich flag XR is set to "0" in Step 316, the CPU 31 determines in Step 320 whether or not the Lean flag XL is "1." When the Rich flag is "0" and the Lean flag XL is "1," the secondary air supplier 10 is functioning normally. Thus, the CPU 31 moves from Step 320 to Step 321 to set the Completion flag XDIAG to "1." Then, the CPU 31 closes the solenoid valve 13 to cut off the supply of the secondary air to the exhaust pipe 3 in Step 322. The counter Ci is cleared in Step 323, and then the routine is terminated.

When the Rich flag XR and Lean flag XL are both set to "0," abnormality detection in the secondary air supplier 10 is again required. The CPU 31 therefore advances from Step 320 to Step 323 to clear the value of the counter Ci, and leaves the routine.

The flags XDIAG, XR and XL are also reset to "0" when the engine 1 is temporarily stopped.

An example of the control of abnormality detection in the secondary air supplier 10 according to the present embodiment will now be described referring to the time chart shown in FIG. 8.

Figure 8:
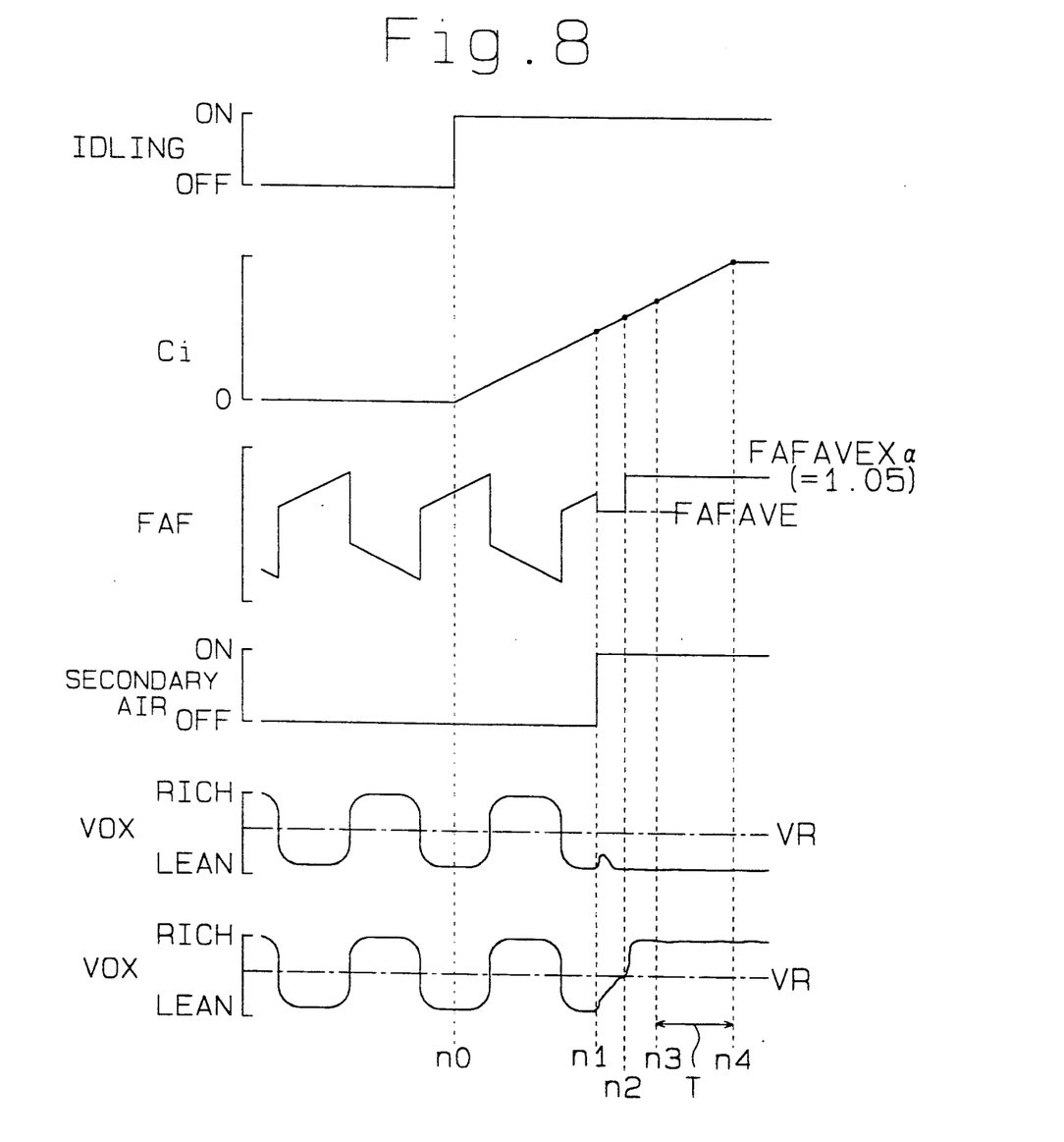
FIG. 8 is a time chart showing the abnormality detection control in FIG. 7.

In FIG. 8, until time n0 at which counting up the value of the counter Ci starts, the feedback control of the air-fuel ratio is performed based on the output voltage of the oxygen sensor, VOX, and the secondary air is not supplied, nor are the idle conditions met. When the idle conditions are satisfied at time n0, the value of the counter Ci starts counting up.

When the count value of the counter Ci reaches the given time n1, the secondary air supply starts. When counting up to the given time n2 is done in consideration of the response delay of the secondary air supplier 10, the feedback control of the air-fuel ratio stops and the control is switched to the open loop control of the air- fuel ratio.

During a period of time in which the value of the counter Ci is counted up to be the given time n4 after the given time n3, determination of the occurrence of any abnormality is carried out.

Here, the secondary air supplier 10 is judged as normal when the secondary air supply starts and the lean status where the output voltage VOX remains lower than the reference value VR is kept. On the other hand, the secondary air supplier 10 is judged as functioning abnormally when the secondary air supply starts and the rich status where the output voltage VOX becomes higher than the reference value VR is maintained.

A period of time from the start of the supply of the secondary air to the start of the judgment of abnormality slightly differs depending on the intake volume and exhaust volume of the engine, the oxygen sensor 23 or the amount of secondary air to be supplied Therefore, it is extremely important that the times n1 to n4 counted up by the counter Ci should be so set as to match an individual engine in use.

As described above, also in this embodiment, it is possible to prevent erroneous detection, such as judging the secondary air supplier 10 as abnormal though it is working normally, thus ensuring the abnormality detection with high reliability.

According to this embodiment, abnormal detection is executed at the idling time when the engine speed and load are almost constant. Thus, the air-fuel ratio in the intake manifold 2a is stably controlled in the abnormality detection, and the abnormality can be detected more accurately because of the steady exhaust air-fuel ratio.

The present invention is not limited to the second embodiment described above, and may be worked out with the structure partially modified as follows within the scope and spirit of this invention.

(a) Referring to the flow charts in FIGS. 7A and 7B according to the second embodiment, in Steps 308 to 310 the amount of compensation of fuel injection. FAF, is set to be $\alpha$ times as great as the approximate value of the theoretical air-fuel ratio, FAFAVE, when a given time has passed since the start of the secondary air supply. The amount FAF, however, may be set to this specific value immediately after the secondary air supply starts.

(b) According to the above embodiment, although the open loop control of the air-fuel ratio is executed simply according to the passage of time since the idle conditions were met, the approximate value FAFAVE may be calculated based on the time having passed after the idle conditions were met, and the air-fuel ratio may be controlled on the basis of the calculation result. In this case, the control of the air-fuel ratio can be executed more accurately, so that the accuracy in abnormality detection may be improved.

(c) Although the idling state has been set as the steady running condition according to the aforementioned embodiment, other conditions than the idling may also be used as long as the load and speed of the engine 1 can be almost constant.

What is claimed is:

1. An apparatus for detecting abnormality in a secondary air supplier, comprising:
    a fuel supplying means for supplying fuel to an intake passage of an engine;
    a secondary air supplying means for supplying secondary air to an exhaust passage;
    an exhaust air-fuel ratio detecting means for detecting an exhaust air-fuel ratio in the exhaust passage downstream of a point where the secondary air is supplied;
    an operational status detecting means for detecting an operational status of the engine; and
    a control means for, based on a detection result from the operational status detecting means,
        (a) judging the completion of an engine warm-up operation,
        (b) activating the secondary air supplying means when it is judged that the secondary air should be supplied,
        (c) controlling the fuel supplying means at a time when the warm-up operation is completed and the secondary air supplying means is in operation, the fuel supplying means being controlled in such a way that a suction air-fuel ratio is forcibly adjusted to a predetermined high value so as to set the exhaust air-fuel ratio low when the secondary air supplying means functions properly and set the exhaust air-fuel ratio high when the secondary air supplying means is abnormal, and
        (d) judging the secondary air supplying means as abnormal and outputting an abnormality judgment signal when a detected value of the exhaust air-fuel ratio detecting means is judged high.

2. An apparatus according to claim 1, wherein when the engine speed is within a predetermined range, the control means drives the fuel supplying means to execute asynchronizing injection for a predetermined period of time to forcibly adjust the suction air-fuel ratio to the predetermined high value.

3. An apparatus according to claim 1, wherein during normal operation of the engine, the control means controls the fuel supplying means upon elapse of the predetermined period of time after the activation of the secondary air supply means so as to forcibly adjust the suction air-fuel ratio to the predetermined high value.

4. An apparatus according to claim 3, wherein the control means further controls the fuel supplying means for the predetermined period of time with a fuel injection compensation amount which sets the suction air-fuel ration to an approximate value of a theoretical air-fuel ratio so as to suppress discharging of harmful components mixed in an exhaust gas.

5. An apparatus according to claim 3, wherein when the engine is idling, the control means controls the fuel supplying means to forcibly adjust the suction air-fuel ratio.

6. An apparatus according to claim 3, wherein the control means activate the secondary air supplying means upon elapse of a predetermined period of time after the engine begins with the normal operation.

7. An apparatus according to claim 1, wherein, when the detected value of the detecting means is high, the control means judges the secondary air supplying means as abnormal upon the elapse of a predetermined period of time after the control means forcibly adjusts the suction air fuel ratio to the predetermined high value.

8. An apparatus according to claim 1, wherein the operational status detecting means includes:
    a throttle position sensor for detecting opening of a throttle;
    a water temperature sensor for detecting a temperature of engine cooling water;
    an engine speed sensor for detecting an engine speed; and
    an air flow meter for detecting an amount of air sucked in the intake passage.

9. An apparatus according to claim 1, wherein the control means has a non-volatile memory to store information of abnormality when it is detected occurring in the secondary air supplying means.

10. An apparatus according to claim 1 further comprising a warning lamp which lights up in response to the abnormality judgment signal from the control means.

11. A method for detecting abnormality in a secondary air supplier for injecting fuel in an intake system of an engine, adjusting an engine output in accordance with a suction air-fuel ratio determined by an air-fuel mixing ratio, detecting an exhaust air-fuel ratio corresponding to the suction air-fuel ratio by means of an exhaust air-fuel ratio detecting means, and activating a secondary air supplier means for supplying secondary air in accordance with a detection result from the exhaust air-fuel ratio detecting means, the method comprising the steps of:
    judging the completion of an engine warm-up operation;
    activating the secondary air supplier when the engine is in the operational status in which the secondary air should be supplied;
    controlling an injected amount of fuel in such a way that the suction air-fuel ratio is forcibly adjusted to a predetermined high value so as to set the exhaust air-fuel ratio low when the secondary air supplier functions properly and set the exhaust air-fuel ratio high when the secondary air supplier is abnormal; and judging the secondary air supplier as abnormal when it is judged that a detected exhaust air-fuel ratio is high and outputting an abnormality judgment signal.

12. A method according to claim 11, wherein when an engine speed is within a predetermined range after the completion of engine warm-up, the secondary air is supplied by executing asynchronizing injection for a predetermined period of time to forcibly adjust the suction air-fuel ratio to the predetermined high value.

13. A method according to claim 11, wherein at a normal operation of the engine, the suction air-fuel ratio is forcibly adjusted to the predetermined high value upon elapse of a predetermined period of time after the secondary air supply means is activated.

14. A method according to claim 13, wherein a amount of fuel injection is adjusted with a fuel injection compensation amount which sets to an approximate value of a theoretical air-fuel ratio for a predetermined period of time so as to suppress the discharging of harmful components mixed in an exhaust gas.

15. A method according to claim 13, wherein when the engine is idling, the amount of the fuel injection is adjusted to forcibly adjust of the air-fuel ratio.

16. A method according to claim 13, wherein the secondary air supplier means is activated upon elapse of a predetermined period of time after the engine begins with the normal operation.

17. A method according to claim 11, wherein when the detected value is high, the secondary air supplying means is judged as abnormal upon the elapse of a predetermined period of time after the forcible adjustment of the suction air fuel ratio to the predetermined high value.

18. A method according to claim 11, wherein abnormality information is stored in a non-volatile memory when an abnormality is detected in the secondary air supplier.

19. A method according to claim 11, wherein a warning lamp is lighted in response to the abnormality judgment signal.

* * * * *

UNITED STATES PATENT AND TRADEMARK OFFICE
CERTIFICATE OF CORRECTION

PATENT NO. : 5,119,631

DATED : June 9, 1992

INVENTOR(S) : Nobuaki KAYANUMA, et al.

It is certified that error appears in the above-identified patent and that said Letters Patent is hereby corrected as shown below:

Column 3, line 33, change "18" to --13--.

Column 4, line 13, change "28" to --23--.

Column 5, line 7, change "106" to --105--.

Column 6, line 25, change "18" to --15--.

Column 8 line 31, between "CPU" AND "judges" insert --31--.

Column 9, line 21, between "ratio" and "become" insert --to--.

Column 10, line 54, insert a period after "supplied".

Column 12, line 13, change "ration" to --ratio--.

Column 12, line 40, change "in" to --into--.

UNITED STATES PATENT AND TRADEMARK OFFICE
CERTIFICATE OF CORRECTION

PATENT NO. : 5,119,631

DATED : June 9, 1992

INVENTOR(S) : Nobuaki KAYANUMA, et al.

It is certified that error appears in the above-identified patent and that said Letters Patent is hereby corrected as shown below:

Column 13, line 20, change "a" to --an--.

Column 14, line 5, delete "of".

Signed and Sealed this

Fourteenth Day of September, 1993

Attest:

BRUCE LEHMAN

Attesting Officer        Commissioner of Patents and Trademarks